United States Patent
Yamane

(10) Patent No.: US 6,718,840 B2
(45) Date of Patent: Apr. 13, 2004

(54) SUN AND PLANET GEAR MECHANISM

(75) Inventor: Kenji Yamane, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/106,457

(22) Filed: Mar. 27, 2002

(65) Prior Publication Data

US 2002/0139205 A1 Oct. 3, 2002

(30) Foreign Application Priority Data

Mar. 28, 2001 (JP) ........................................ 2001-093027

(51) Int. Cl.[7] ................................................. F16H 3/34
(52) U.S. Cl. ........................................... 74/354; 475/15
(58) Field of Search ................................ 74/354; 475/15

(56) References Cited

U.S. PATENT DOCUMENTS

| | | | | |
|---|---|---|---|---|
| 829,068 A | * | 8/1906 | Fox ................................ | 74/354 |
| 2,344,434 A | * | 3/1944 | Wigglesworth ............. | 409/320 |
| 2,535,194 A | * | 12/1950 | Carpenter ..................... | 74/355 |
| 2,754,697 A | * | 7/1956 | Luebking ...................... | 475/15 |
| 4,516,648 A | * | 5/1985 | Berger et al. ............... | 180/6.66 |
| 5,018,401 A | * | 5/1991 | Ida et al. ...................... | 74/354 |
| 5,365,301 A | * | 11/1994 | Sugita et al. ................ | 396/144 |
| 5,456,419 A | * | 10/1995 | Ezawa .......................... | 242/356 |
| 5,729,779 A | * | 3/1998 | Oshima ........................ | 396/418 |
| 5,823,454 A | * | 10/1998 | Erck ............................. | 242/332 |
| 5,835,805 A | * | 11/1998 | Izaki et al. .................... | 396/411 |
| 6,086,503 A | * | 7/2000 | Konishi et al. .............. | 475/346 |
| 6,343,880 B1 | * | 2/2002 | Kamoda et al. ............. | 396/411 |

FOREIGN PATENT DOCUMENTS

JP 11-052461 2/1999

* cited by examiner

Primary Examiner—Rodney H. Bonck
Assistant Examiner—David D. Le
(74) Attorney, Agent, or Firm—Young & Thompson

(57) ABSTRACT

In a center of a sun gear an inner cylindrical portion is provided. The inner cylindrical portion is rotatably fitted to a fixed shaft. On the sun gear a circular groove is formed around the inner cylindrical portion. At a center of a planet lever an outer cylindrical portion is formed. The outer cylindrical portion fits to the inner cylindrical portion in the groove. On the inner cylindrical portion plural arms are formed, and an end of each arm contacts to a wall of the groove with an adequate pressure. When the sun gear rotates, a frictional force is generated by contact of between the wall and the arm and has an effect on the planet lever to swing with the sun gear. The planet gear attached to the planet lever revolts about the sun gear.

15 Claims, 8 Drawing Sheets

SUN AND PLANET GEAR MECHANISM

BACKGROUND OF THE INVENTION

1. Field of the Invention

The present invention relates to a sun and planet gear mechanism.

2. Description Related to the Prior Art

A sun and planet gear mechanisms is widely used as a clutch mechanism which selectively transmits the drive of a motor to a gear train in accordance with a direction of the rotation of the sun and planet gear mechanism caused by the motor. The sun and planet gear mechanism is constructed of a fixed shaft, a sun gear rotatable around the fixed shaft, a planet lever and a planet gear supported by the planet lever. The planet lever swings in the same rotational direction of the sun gear. Accordingly, the planet gear revolves around the fixed shaft to mesh with one of the two gear trains. For changing the gear train with which the planet gear meshes, the swing of the planet gear is necessary. The Japanese Patent Laid-open Publication No. H11-52461 supposes an improvement of the sun and planet gear mechanism for easy swing of the planet lever.

As shown in FIG. 7 and 8, the sun and planet gear mechanism disclosed in the above Publication is constructed a sun gear 2, two planet gears 3, 4, a planet lever 5 and a fixed shaft 6. The planet lever 5 is V-shaped and has two arms. On a crossed position of two arms is formed a shaft cylinder 5a, and in ends of the respective arms are formed gear shafts 5b, 5c. The shaft cylinder 5a fits in a hole 2a formed in the sun gear 2. The gear shafts 5b, 5c is inserted in shaft holes 3a, 4a formed the planet gears 3, 4 so as to rotatably support them. The shaft cylinder 5 has a hole 5d in which the fixed shaft 6 is inserted.

In the sun gear 2, a ring-shape groove 2b is formed around a rotational axis 7. Into the groove 2b are inserted elastic protrusions 5e, 5f formed so as to protrude from the planet lever 5 upwards with inclination. When the sun and planet gear mechanism is assembled, the fixed shaft 6 is inserted in the hole 5d of the planet lever 5, and then the shaft cylinder 5a of the planet lever 5 is inserted into the shaft hole 2a of the sun gear 2. Thereby the two elastic protrusions 5e, 5f enter in the groove 2b of the sun gear 2 and presses an outer wall 2c of the groove 2b. When the sun gear 2 rotates, there is a friction between the outer wall 2c and the elastic protrusions 5e, 5f. According to the friction, the planet gear 5 swings by following the rotation of the sun gear 2. Therefore, the planet gears 3, 4 revolve.

However, as the planet lever 5 contacts the fixed shaft 6, there is a contact resistance between the hole 5d and the fixed shaft 6. Therefore, a force of the rotation of the sun gear 2 is not enough transmitted to the planet lever 5. Therefore the sun gear often does not rotate smoothly. In this case, the planet gears hardly revolve.

SUMMARY OF THE INVENTION

An object of the present invention is to provide a sun and planet gear mechanism in which a planet gear revolve smoothly.

Another object of the present invention is to provide a sun and planet gear mechanism in which a contact resistance is small.

In order to achieve the object and the other object, in a sun and planet gear mechanism of the present invention, a sun gear is rotatably fitted on a fixed shaft. A part of the sun gear contacts to a planet lever to generate a frictional force. Accordingly, when the sun gear rotates, the frictional force causes to swing the planet lever. In the sun gear is formed a cylindrical portion in which the fixed shaft is fitted, and in the planet lever is formed a shaft cylinder in which the cylindrical portion is fitted. The shaft cylinder can move on a periphery of the cylindrical portion of the sun gear smoothly.

Further, the planet lever has a contact portion for fitting to a groove which is formed around the cylindrical portion of the sun gear. As there is an adequate friction between the contact portion and the periphery, the rotation of the sun gear is transmitted to the planet lever.

According to the sun and planet gear mechanism of the present invention, the sun gear is fitted on the rotary shaft, a contact resistance may be decreased while the rotation of the sun gear is transmitted to the planet lever. Therefore, the planet lever is smoothly swung.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
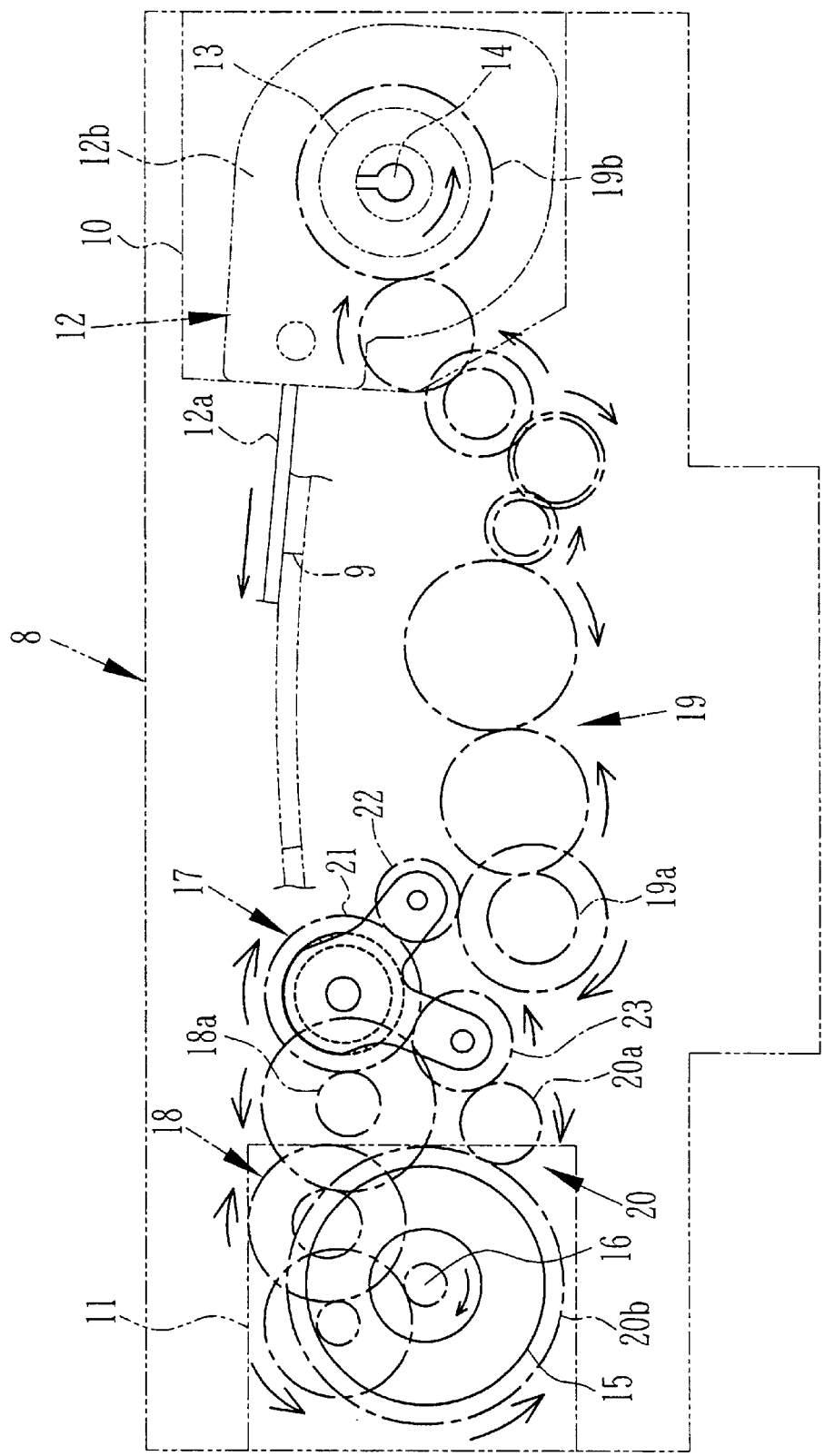
FIG. 1 is a schematic diagram of a film feeding device in which a sun and planet gear mechanism is used, illustrating a film winding situation.
Figure 2:
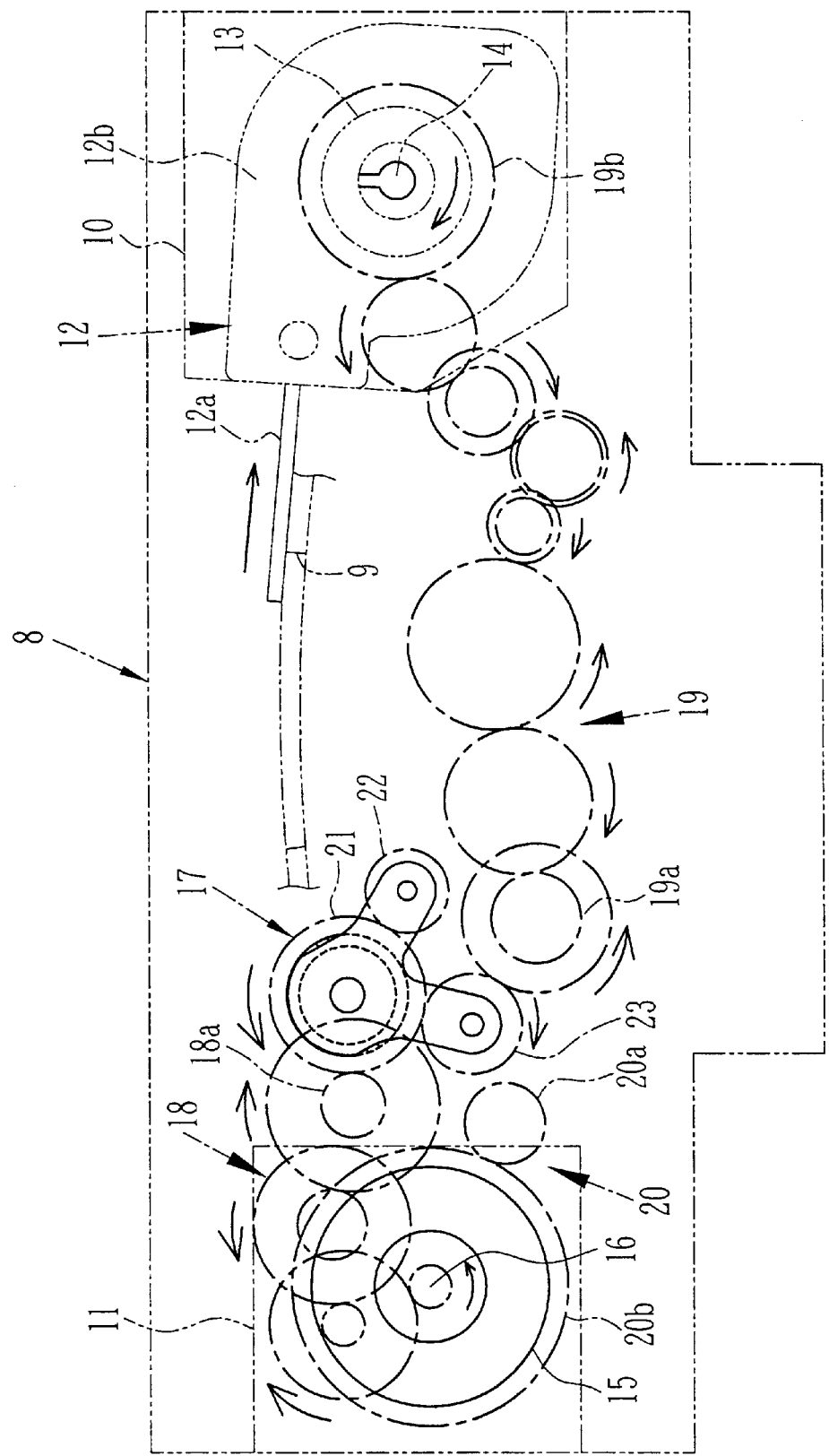
FIG. 2 is a figure as same as FIG. 1, illustrating film rewinding situation.

In FIGS. 1 and 2, a camera 8 includes an exposure aperture 9, a cartridge chamber 10, a take-up chamber 11 and a film feed mechanism. The cartridge chamber 10 is provided with a spool drive shaft 14 which engages with a spool 13 of a film cartridge 12. In the take-up chamber 11, there is a take-up spool 15 which is coated with rubber. In the take-up spool 15 a motor 16 is disposed for driving the film feed mechanism. When a photo film is wound, as shown in FIG. 1, the motor 16 rotates in a clockwise direction, and when the photo film is rewound, as shown in FIG. 2, the motor 16 rotates in a counterclockwise direction.

The film cartridge 12 is an IX240 type, in which a photo film 12a, when it is not used, is entirely contained in a cartridge 12b. As shown in FIG. 1, after loading the film cartridge 12 in the camera 8, the motor 16 drives the spool drive shaft 14 to rotate the spool 13 of the cartridge 12b in the unwinding direction. Then the photo film 12a is fed out from the cartridge 12 and advanced onto the take-up spool 15. Further, after completion of exposure of all frames, as shown in FIG. 2, the motor drives the spool drive shaft 14 to rotate the spool 13 in the winding direction, the photo film 12a is entirely wound in the cartridge 12b.

The film feed mechanism is constituted of a sun and planet gear mechanism 17, a drive gear train 18, a first transmission gear train 19 and a second transmission gear train 20. The drive gear train 18 transmits the rotation of the motor 16 to the sun and planet gear mechanism 17. In the first transmission gear train 19, a rotation of the sun and planet gear mechanism 17 is transmitted through an initial gear 19a to a last gear 19b. The last gear 19 rotates the spool drive shaft 14 and the spool 13. In the second transmission gear train 20, a rotation of the sun and planet gear mechanism 17 is transmitted through an initial gear 20a to a last gear 20b to rotate the take-up spool 15.

The sun and planet gear mechanism 17 has a sun gear 21 and two planet gears 22, 23. The sun gear 21 is meshed with a gear 18a of the drive gear train 18. When the photo film 12a is advanced, the motor 16 causes to rotate the sun gear 21 and revolve the planet gears 22, 23 in the clockwise direction. Then the planet gears 22, 23 respectively mesh with the initial gears 19a, 20a to rotate the spool drive shaft 14 and the take-up spool 15 in the clockwise direction. When the photo film 12a is fed back in the film cartridge 12, the motor 12 causes to rotate the sun gear 21 and to revolve the planet gear 23 in the counterclockwise direction. Then the planet gear 23 is meshed with the initial gear 19a to rotate the spool drive shaft 14 in the counterclockwise direction (a take-up direction). Thereby the planet gear 22 leaves the initial gear 19a and rotates with idling.

Figure 3:
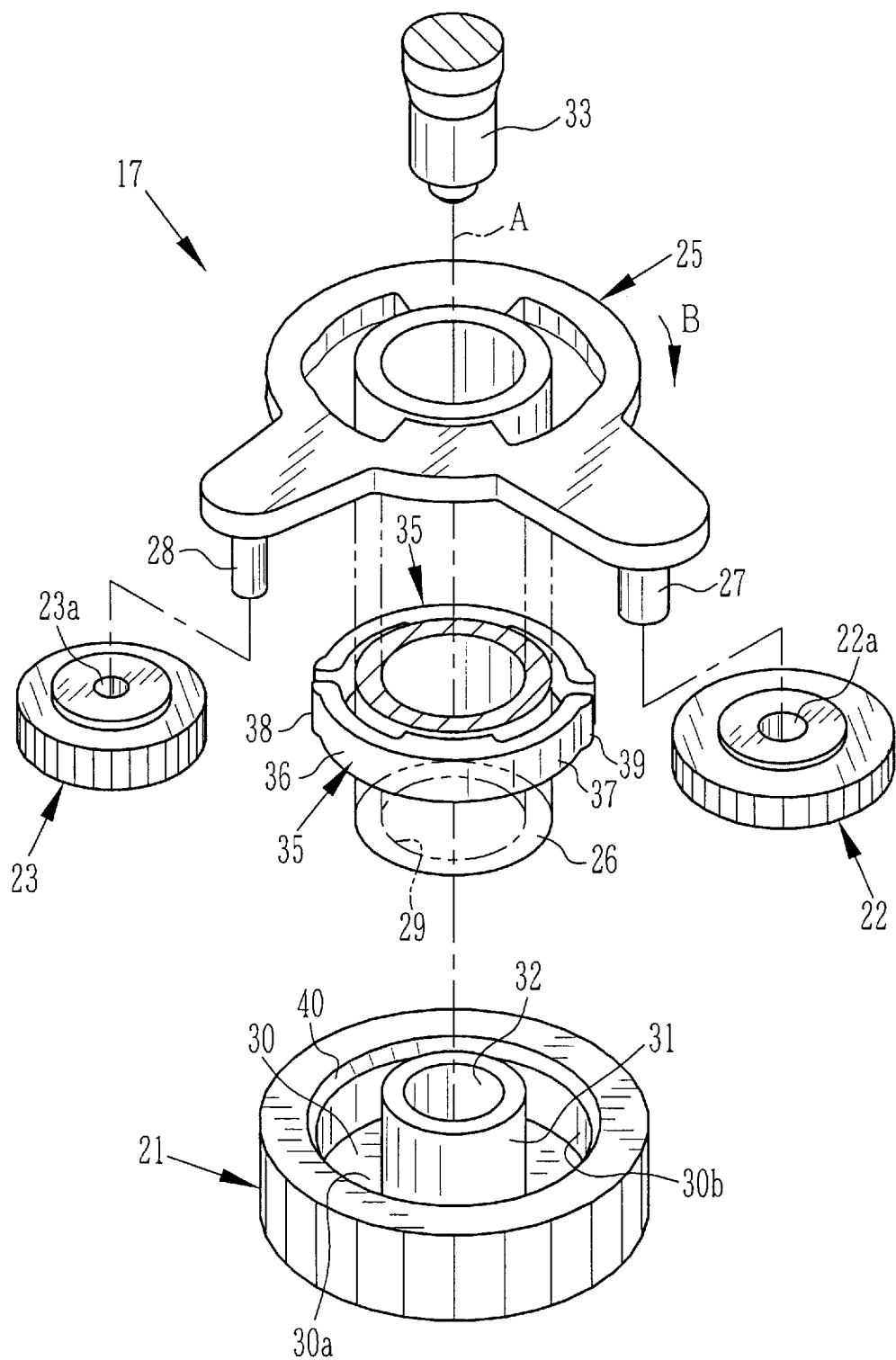
FIG. 3 is an exploded perspective view of the sun and planet gear mechanism of the present invention.

As shown in FIG. 3, the sun and planet gear mechanism 17 is constructed of a fixed shaft 33 and a V-shaped planet lever 25. In the planet lever 25, a cylindrical protrusion 26 and two pivots 27 and 28 are formed so as to protrude along a rotary axis A. Through the cylindrical protrusion 26 a hole 29 is formed. To the pivots 27, 28 at both ends of the cylindrical portion, the planet gears 22, 23 are rotatably attached.

In a center of the sun gear 21, a ring-shape groove 30 is provided to form a cylindrical portion 31 protruding from a bottom 30a of the groove 30. A periphery of the cylindrical portion 31 fits to the hole 29 such that the planet lever 25 may be swingable. Through the cylindrical portion 31 is formed a shaft hole 32 in which the fixed shaft 33 is fitted to rotatably support the sun gear 21.

Figure 4:
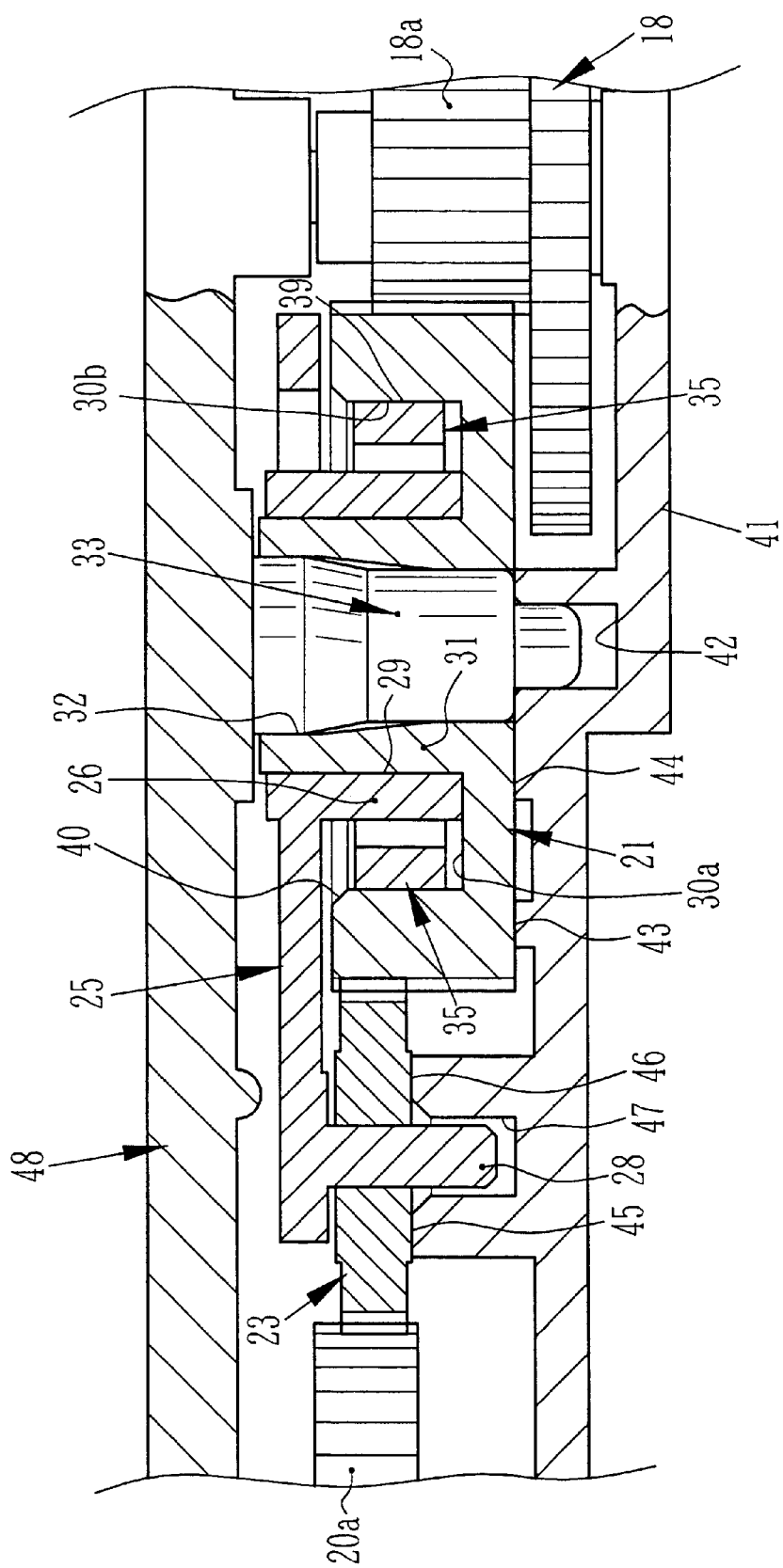
FIG. 4 is a vertical sectional view of a sun and a planet gear.
Figure 5:
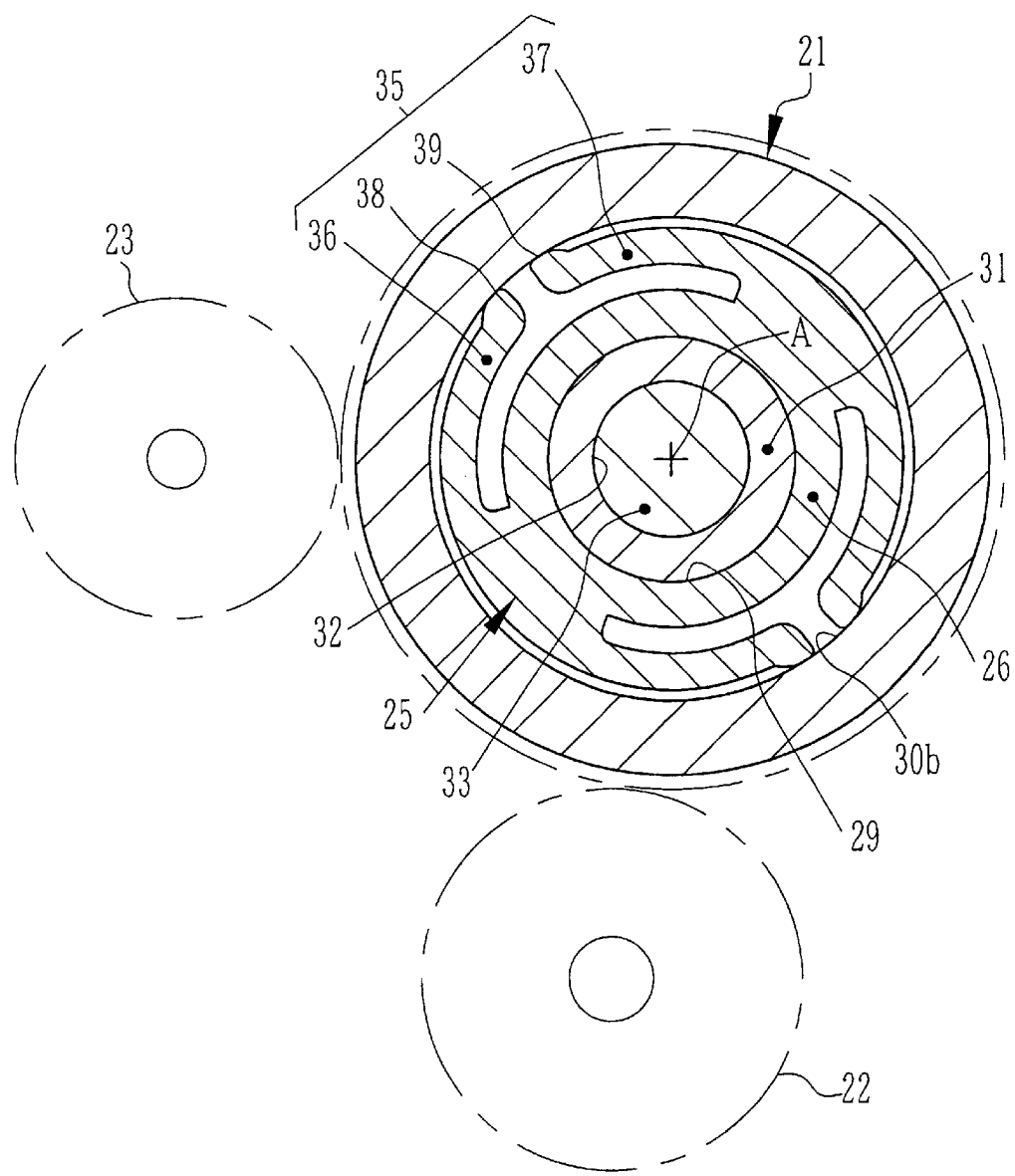
FIG. 5 is a cross-sectional view of a sun gear in an assembling situation.

As shown in FIGS. 4 and 5, two elastic arm sections 35 are formed on a periphery of the cylindrical protrusion 26. The arm sections 35 are disposed symmetrically with the rotational axis A and contact on an outer wall 30b of the groove 30. Between the arm sections 35 and an outer wall 34 there is an adequate friction. Each arm section 35 is constructed of a pair of arms 36, 37 and contact portions 38, 39. The pair of the arms 36, 37 is arc-shaped and elastically formed. The contact portions 38, 39 are formed at respective ends of the arms 36, 37 so as to press the outer wall 30b.

The sun gear 21 has a taper 40 for easy insertion of the pair of the arm sections 35 in the groove 30. The contact portions 38, 39 are pressed by the taper 40 such that the pair of the arm portions is elastically deformed to enter into groove 30 when the planet lever 25 is attached to the sun gear 21. Thereafter, the contact portions 38, 39 press the outer wall 30b with an adequate pressure.

As shown in FIG. 4, the sun and planet gear mechanism 17 is supported with a base plate 41. On the base plate 41 a hole 42, protuberances 43–46 and two grooves 47 are formed. In the hole 42, an end of the fixed shaft 33 is inserted. The protuberances 45, 46 support the planet gears 22. The protuberances 43, 44 support the sun gear 21 and have an arc shaped form extending in a rotational direction of the sun gear 21 to confront each other. Between the protuberances 45, 46 the groove 47 is disposed, and a width of the groove 47 is larger than a diameter of the pivot 27. Note that the protuberance 43–46 and the groove 47 for the planet gear 23 are also formed on the base plate 41.

Now, a process of assembling the sun and planet gear mechanism 17 will be explained. The sun gear 21 is disposed on the base plate 21 such that the groove 30 may open upwards and a center of the shaft hole 32 may face to the hole 42 of the base plate 41. Then, the planet gears 22, 23 are disposed on the base plate 41 in a situation of mesh with the sun gear 21 and confronting to the groove 47 of the holes 22a, 23a. Thereafter, the cylindrical portion 31 of the sun gear 21 is inserted into the hole 29 of the cylindrical protrusion 26 such that the planet lever 25 may be attached. Thereby, the pivots 27, 28 are inserted into the holes 22a, 23a respectively. After attachment of the planet lever 25, a lower edge of the cylindrical protrusion 26 contacts to the bottom 30a of the groove 30.

In this embodiment, in the sun gear 21 the groove 30 is formed, and the cylindrical protrusion 26 is inserted in the groove 30. Accordingly, although a contact area of the planet lever 25 and the sun gear 21 becomes larger, a height from the sun gear 21 to the planet lever 25 becomes smaller.

After attachment of the planet lever 25, on a camera body is attached a top plate 48 on which the fixed shaft 33 is formed, so as to cover the sun and planet gear mechanism. Thereby, the fixed shaft is inserted through the shaft hole 32 of the sun gear 21, and fits in the hole 42. Accordingly, the sun gear 21, the planet lever 25, and the planet gears 22, 23 are hold between the base plate 41 and the top plate 48.

Effects of the structure above described are explained now. By winding the photo film 12a, as shown in FIG. 1, the motor 16 rotates the sun gear 21 through the drive gear train 18 in the clockwise direction around the fixed shaft 33. The rotation of the sun gear 21 is transmitted to the planet gears 22, 23.

Further, as the contact portions 38, 39 contacts to the outer wall 30b, the frictional force is generated and biases the planet lever 25 to swing in the same direction of the sun gear 21. The planet lever 25 is swingably supported only by the periphery of the cylindrical portion 31. Thus, as not contacting another than the sun gear 21, the planet lever 25 can smoothly swing in the arrowed direction B with the rotation of the sun gear 21, and, accordingly, the planet gears 22, 23 revolute with certainness. The planet gears 22, 23 are smoothly meshed with the initial gears 19a, 20a respectively.

When the planet gear 22, 23 are engaged with the initial gear 19a, 20a, the drive of the motor 16 is transmitted to the first transmission gear train 19 and the second transmission gear train 20 such that the spool drive shaft 14 and the take-up spool 15 are rotated in the counterclockwise direction in FIG. 1. Thereby, the photo film 12a is fed out of the cartridge 12b and advanced behind the exposure aperture 6 for taking-up around the take-up spool 15. When the first frame of the photo film 12a is set behind the exposure aperture 9, the motor 16 stops. Then, the photo film 12a is advanced for a length of one frame just after an exposure is carried out.

When all of the frames are photographed, the motor 16 drives to rewind the photo film 12a in the film cartridge 12. As shown in FIG. 2, the motor 16 drives the sun gear 21 to rotate counterclockwise. The rotation of the sun gear 21 in the counterclockwise direction causes the planet lever 25 to swing in the reversed direction of the arrowed direction B. Thus the planet gear 23 engages with the initial gear 19a.

When the planet gear 23 engages with the initial gear 19a, the drive of the motor 16 is transmitted only to the first transmission gear train 19. As the spool drive shaft 14 is rotated in the clockwise direction, the spool 13 is rotated in the film rewinding direction. Then the photo film 12a is wound about the spool 13 in the cartridge 12b. Thereby, as the initial gear 20a of the second transmission gear train 20 is released from the planet gear 23, the take-up spool 15 can be rotated in accordance with the running of the photo film 12a.

Further, the arm section 35 and the planet lever 25 may be separately formed. In this case, the arm section may be fixed to the periphery of the cylindrical protrusion 26. Further, although the periphery of the cylindrical portion 31 contacts the planet lever 25, the outer wall 30b of the groove 30 may contact to a periphery of the cylindrical portion 31 for supporting the planet lever 25. In this case, the arm section 35 contacts the periphery of the cylindrical portion 31.

Figure 6:
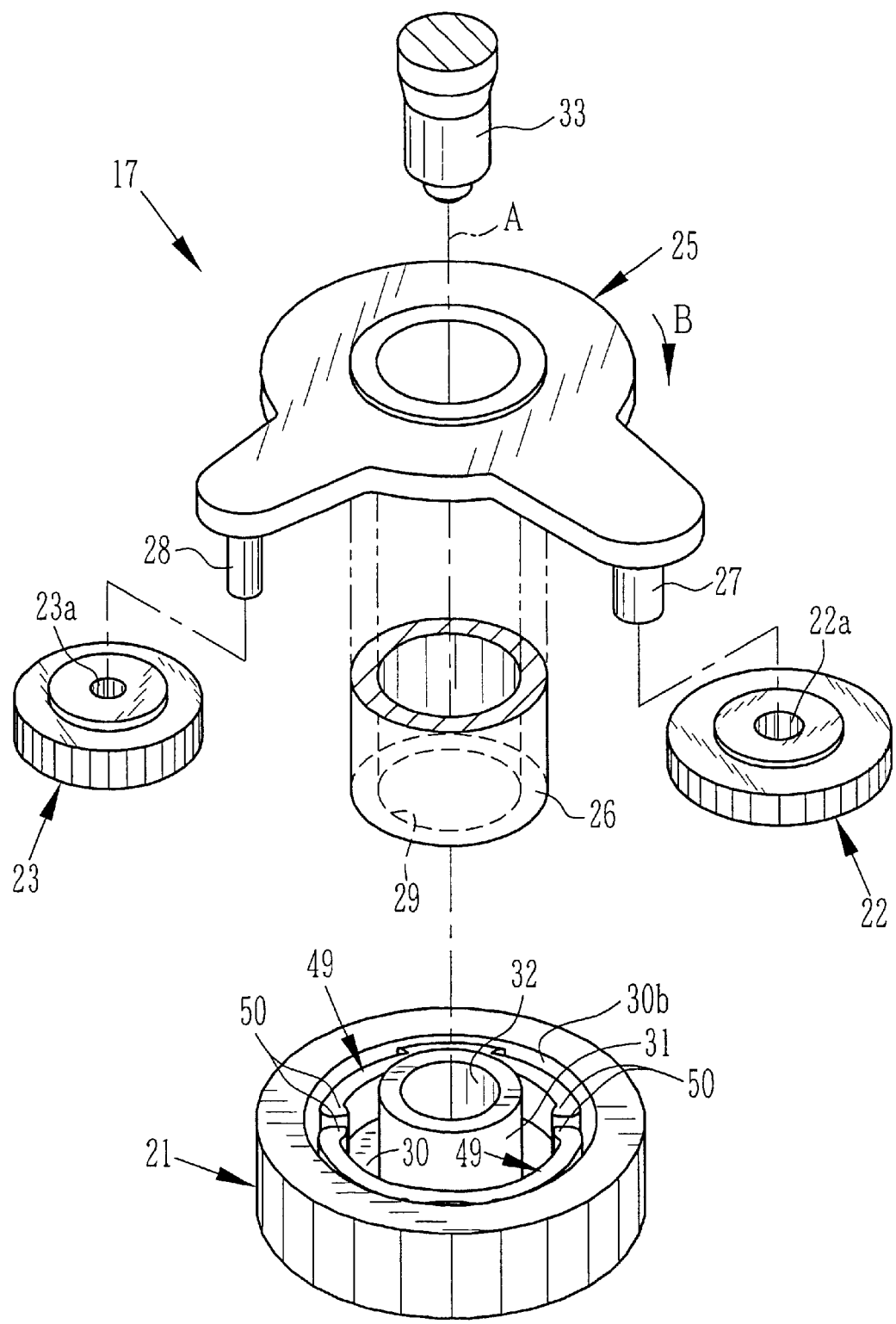
FIG. 6 is an exploded perspective view of a second embodiment of the present invention.
Figure 7:
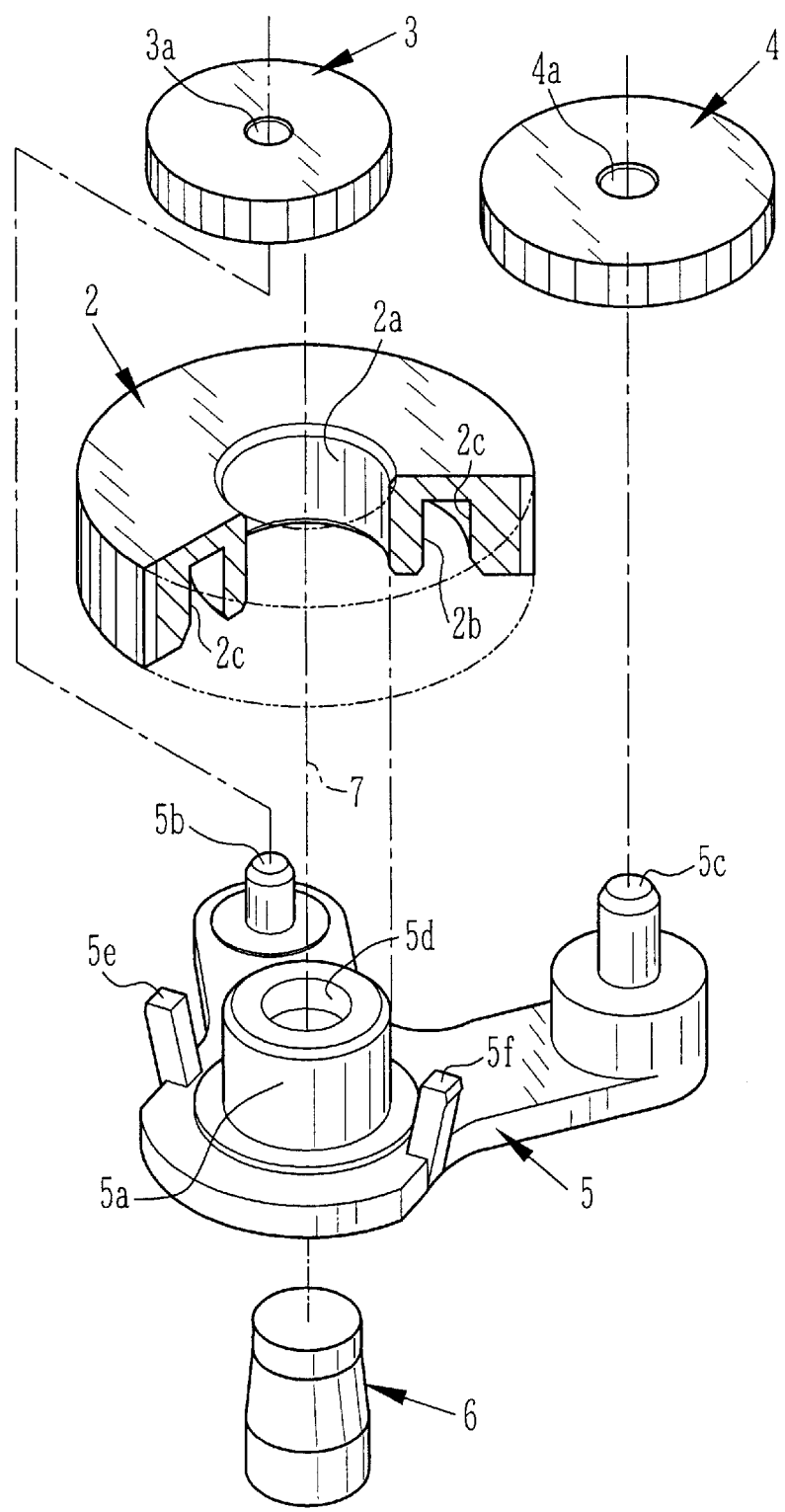
FIG. 7 is an exploded perspective view of a sun and planet gear mechanism in the prior art.
Figure 8:
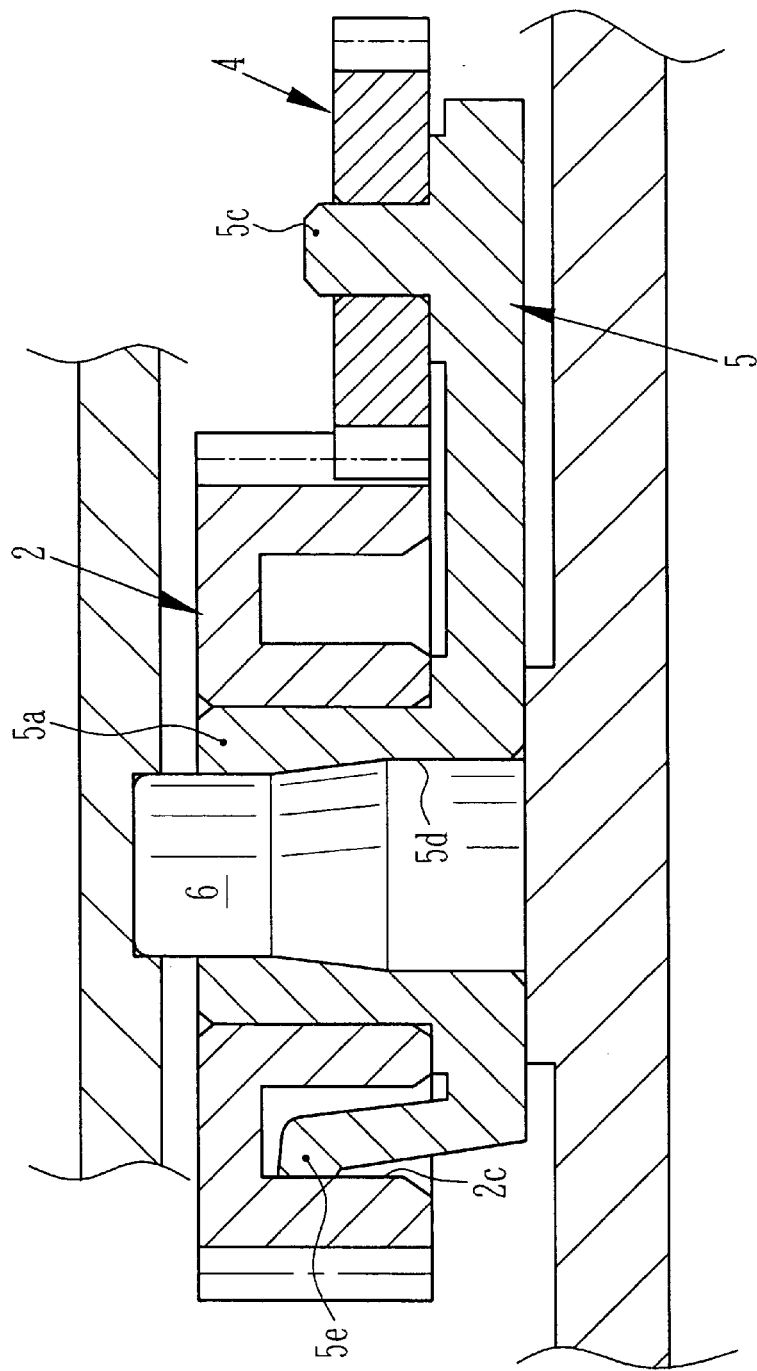
FIG. 8 is a vertical sectional view of the sun and planet gear mechanism of FIG. 7.

FIG. 6 illustrates another embodiment of the present invention. An arm section 49 is integrally formed with the wall 30b of the groove 30 of the sun gear 21. On the arm section 49, elastic arms are formed as same as in FIG. 3. A contact portion 50 is provided at an end of each arm and contacts to the periphery of the cylindrical protrusion 26 in an adequate force.

The above sun and planet gear mechanism 17 is applied to other mechanisms than the film feeding mechanism. Further, the numbers of the sun gear and the planet gear may be more than one and two respectively. Furthermore, the present invention may be varied to an internal sun and planet gear mechanism constructed of an internal gear, a sun gear and three planet gears.

Various changes and modifications are possible in the present invention and may be understood to be within the present invention.

What is claimed is:

1. A sun and planet gear mechanism comprising:
   a fixed shaft;
   a sun gear rotatably fitted on said fixed shaft;
   at least one planet gear meshed with said sun gear, a rotation of said sun gear being transmitted to said at least one planet gears; and
   a planet lever for rotatably supporting said planet gears, swingably attached to said sun gear, a frictional force between said planet lever and said sun gear causing said planet lever to swing with rotation of said sun gear such that said at least one planet gear may revolve about said sun gear;
   wherein said sun gear has a first cylindrical portion in which said fixed shaft is fitted and a circular groove formed around said first cylindrical portion; and
   said planet lever has a second cylindrical portion which rotatably fits on a periphery of said first cylindrical portion in said circular groove.

2. A sun and planet gear mechanism according to claim 1, wherein said planet lever further has a plurality of arms formed on a periphery of said second cylindrical portion, said arms being contained in said circular groove, and a part of each arm contacting to a wall surrounding said circular groove to generate said frictional force.

3. A sun and planet gear mechanism according to claim 2, wherein said arm is elastic and an end thereof contacts to said wall with an adequate contact pressure.

4. A sun and planet gear mechanism according to claim 3, wherein a lower end of said second cylindrical portion of said planet lever contacts to a bottom of said circular groove.

5. A sun and planet gear mechanism according to claim 1, wherein said sun gear has a plurality of arms provided for said circular groove, said arms contacting to a periphery of said second cylindrical portion of said planet lever to generate said frictional force.

6. A sun and planet gear mechanism according to claim 5, wherein said arm is elastic and an end thereof contacts to a periphery of said second cylindrical portion with an adequate contact pressure.

7. A sun and planet gear mechanism according to claim 6, wherein a lower end of said second cylindrical portion of said planet lever contacts to a bottom of said groove.

8. A sun and planet gear mechanism comprising:
   a fixed shaft;
   a sun gear rotatably fitted on and in direct contact with said fixed shaft;
   at least one planet gear meshed with said sun gear, a rotation of said sun gear being transmitted to said at least one planet gears; and
   a planet lever for rotatably supporting said planet gears, swingably attached to said sun gear, a frictional force between said planet lever and said sun gear causing said planet lever to swing with rotation of said sun gear such that said at least one planet gear may revolve about said sun gear
   wherein said sun gear has a first cylindrical portion in which said fixed shaft is fitted and a circular groove formed around said first cylindrical portion; and
   said planet lever has a second cylindrical portion which rotatably fits on a periphery of said first cylindrical portion in said circular groove.

9. A sun and planet gear mechanism according to claim 8, wherein said planet lever further has a plurality of arms formed on a periphery of said second cylindrical portion, said arms being contained in said circular groove, and a part of each arm contacting to a wall surrounding said circular groove to generate said frictional force.

10. A sun and planet gear mechanism according to claim 9, wherein said arm is elastic and an end thereof contacts to said wall with an adequate contact pressure.

11. A sun and planet gear mechanism according to claim 10, wherein a lower end of said second cylindrical portion of said planet lever contacts to a bottom of said circular groove.

12. A sun and planet gear mechanism according to claim 8, wherein said sun gear has a plurality of arms provided for said circular groove, said arms contacting to a periphery of said second cylindrical portion of said planet lever to generate said frictional force.

13. A sun and planet gear mechanism according to claim 12, wherein said arm is elastic and an end thereof contacts to a periphery of said second cylindrical portion with an adequate contact pressure.

14. A sun and planet gear mechanism according to claim 13, wherein a lower end of said second cylindrical portion of said planet lever contacts to a bottom of said groove.

15. The sun and planet gear mechanism of claim 8, wherein the planet lever and the fixed shaft are arranged so that the planet lever is not in direct contact with the fixed shaft.

* * * * *